United States Patent [19]

Trunzo

[11] Patent Number: 4,983,206
[45] Date of Patent: Jan. 8, 1991

[54] BATCH CHARGER FOR GLASS FURNACE

[75] Inventor: Angelo J. Trunzo, Washington, Pa.

[73] Assignee: Frazier-Simplex, Inc., Washington, Pa.

[21] Appl. No.: 494,770

[22] Filed: Mar. 16, 1990

[51] Int. Cl.$^5$ .............................................. C03B 3/00
[52] U.S. Cl. ...................................... 65/335; 65/27; 414/166
[58] Field of Search .......................... 65/135, 335, 27; 414/166

[56] References Cited

U.S. PATENT DOCUMENTS

| | | | |
|---|---|---|---|
| 1,483,278 | 2/1924 | Carey . | |
| 1,999,761 | 4/1935 | Howard . | |
| 2,090,056 | 8/1937 | Longenecker | 214/28 |
| 2,831,569 | 4/1958 | Cagle | 198/224 |
| 2,872,180 | 2/1959 | Tietig, Jr. et al. | 266/34 |
| 2,910,194 | 10/1959 | Keefer | 214/18 |
| 3,587,881 | 6/1971 | Kurtz | 214/33 |
| 3,780,889 | 12/1973 | Frazier et al. | 214/33 |
| 4,004,903 | 1/1977 | Daman et al. | 65/135 |
| 4,197,109 | 4/1980 | Frazier et al. | 65/335 |
| 4,226,564 | 10/1980 | Takahashi et al. | 414/166 |
| 4,290,797 | 9/1981 | Rossi | 65/335 |
| 4,545,717 | 10/1985 | Wittler et al. | 414/166 |
| 4,854,959 | 8/1989 | Waltert | 65/335 |

Primary Examiner—Robert L. Lindsay
Attorney, Agent, or Firm—Webb, Burden, Ziesenheim & Webb

[57] ABSTRACT

A batch charger for feeding raw batch material to a glass furnace includes a jacking assembly for raising and lowering the charger plates for improved angular adjustment thereof. The batch charger includes an adjustable charger plate crank assembly for regulating the working stroke of the charger plates and further includes adjustable batch gate assemblies for controlling the height of the raw batch blanket deposited on the charger plates. A power train is also included which permits operation of the charger by one or both of the drive motors in independent or duplex drive modes.

20 Claims, 9 Drawing Sheets

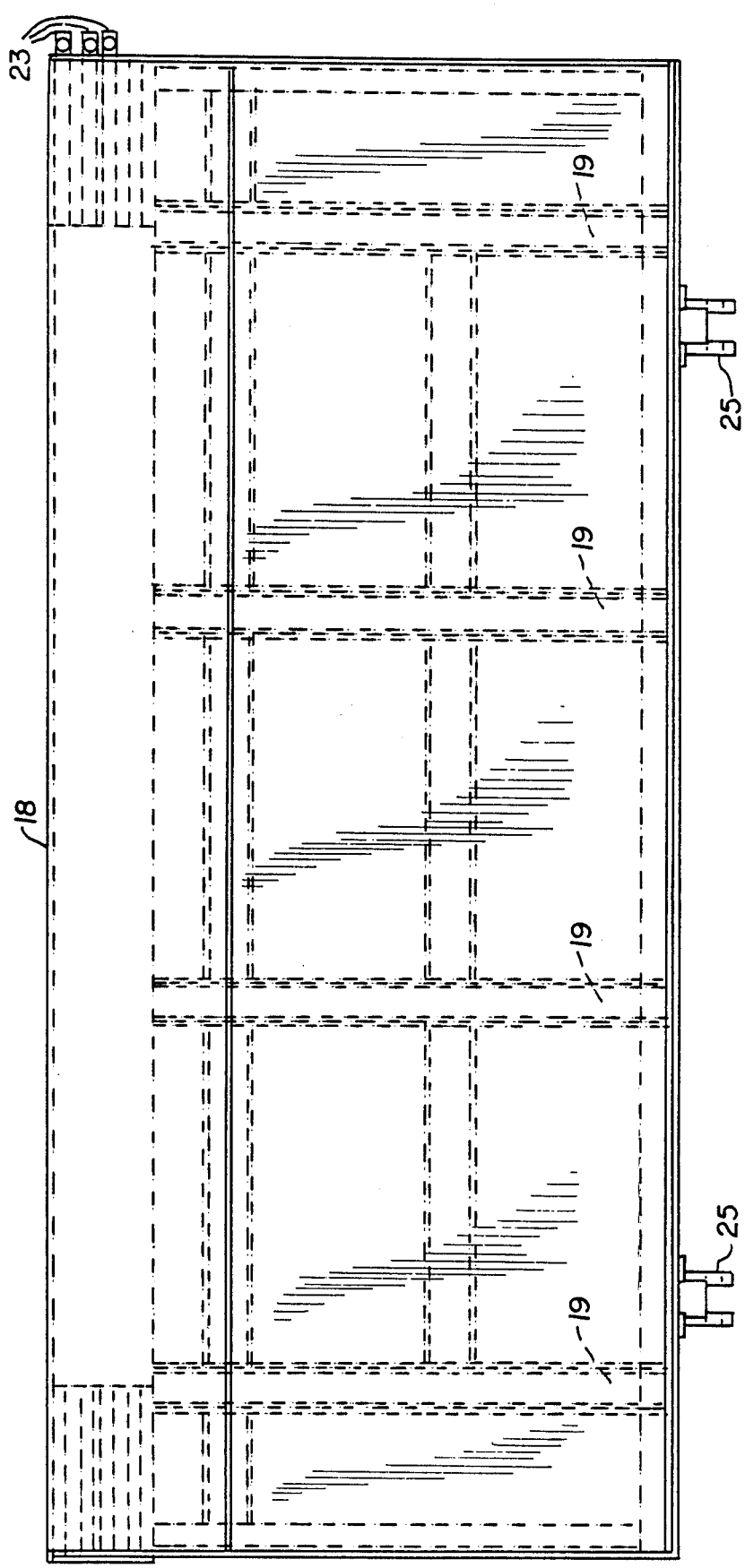

BATCH CHARGER FOR GLASS FURNACE

BACKGROUND OF THE INVENTION

The present invention relates generally to charging apparatus for introducing raw materials into a glass melting furnace and, more particularly, to so-called blanket batch chargers, of the type disclosed in U.S. Pat. Nos. 3,780,889 and 4,197,109 to Frazier et al., and commonly owned with the present invention.

A continuous furnace used for the manufacture of glass typically comprises a large rectangular tank in which the molten bath of glass is contained. A raw batch mixture is continuously introduced into the rear of the furnace by batch charging apparatus of the type mentioned above. At the feed end of the furnace, the batch material is first melted in a melting zone, proceeds to a central zone, and then to a fore hearth region where the molten glass is removed for formation into the desired finished product, such as flat glass or other shapes. The quality of the glass product is largely dependent upon the uniformity of the melt. Furnace efficiency may vary considerably, depending upon the rate of batch feeding and the manner in which the raw batch material is introduced into the furnace. The charging end of the glass furnace typically includes a structure having a charging bay generally referred to in the art as the "doghouse". This furnace structure includes a suspended wall set inwardly from a lower rear wall of the charging bay, leaving an open or semi-open trough therebetween, defining the so-called doghouse across a substantial part of the full width of the furnace. This width varies, and in present furnace structures, can be on the order of 20 to 30 feet in width.

The doghouse provides a downwardly extending open area above the level of the molten glass into which the mixture of glass forming ingredients, or raw batch, is charged. The raw batch material initially floats on the molten glass and melts as it moves forward into the furnace.

The batch charger disclosed in U.S. Pat. No. 3,780,889 has a charger plate that downwardly extends into the exposed area of the doghouse and reciprocates in a direction along the long axis of the furnace. The charger plate is positioned beneath a hopper chute such that as the charger plate moves forward from a retracted limit of travel, raw batch material from the hopper chute is deposited in a layer on the charger plate. Simultaneously, the nose or forward edge of the charger plate pushes a previously deposited layer of the floating batch under the suspended wall at the end of the doghouse into the melting zone of the furnace. As the charger plate moves rearwardly, the layer of batch material then residing on the charger plate is obstructed by a sand seal device at the rear of the hopper from being carried rearwardly and is moved off the charger plate to fall over the nose into the open area of the furnace from which the previous charge has just been cleared. This reciprocating cycle is continuously repeated to maintain a substantially constant level of molten glass in the furnace as the melt is removed at the fore hearth region.

It should be noted that typical glass batch feeders in present day glass producing furnaces are quite massive and difficult to adjust quickly to accommodate operational variables. On furnaces over 20 feet in width, there are typically two charger plates positioned side-by-side. Heretofore, each of these charger plates have employed separate drive motors and drive trains for imparting reciprocating motion thereto. If one of the motors should fail, the entire charger is disabled. A further shortcoming resides in the fact that the charger plates slope downwardly toward the glass level in the furnace at an angle of the order 10 to 15 degrees from the horizontal and it has been customary to individually adjust the angle of each of these plates which has proved to be quite labor intensive. In addition, the lower ends of the hopper chutes in prior devices are provided with a plurality of laterally arrayed adjustable gates. By adjusting these gates up or down with respect to the charger plate, the thickness of the blanket of raw batch deposited on the charger plate can be regulated so that the batch blanket may be thicker at some places across the plate than at others, or vice versa. In this manner, the firing characteristics and currents generated in the furnace bath may be controlled. The adjustment of these gates in prior batch chargers has proven to be troublesome since it is difficult to accurately ascertain by visual observation the exact height of the gate openings.

The final glass quality is also dependent upon the quantity of raw batch material charged into the furnace with each reciprocating stroke of the charger plate. The adjustment of the stroke in prior batch chargers is relatively limited and difficult and time consuming to achieve. It has been observed that continuous melting furnaces of identical construction may exhibit unpredictable variations in performance due to eddy currents, convective currents, flame flow and other factors which influence the quality of the glass and fuel consumption or efficiency in the furnace. It has been observed that a change in the feeding of the batch material results in a noticeable change in fuel efficiency. Because of the individuality of each furnace, it is often necessary to tailor the batch feeder characteristics to maximize the efficiency of a particular furnace. It is, thus, desirable to be able to adjust the stroke length and angular inclination of the charger plate to known values while also adjusting the heights of the plurality of batch gates.

Heretofore, it has proven very difficult, timeconsuming and expensive to make the desired machinery adjustments in large batch chargers without undue interference or downtime in the continuous charging process. Even when such machinery adjustments are possible, it is not always possible or feasible to insure accuracy and duplicity of adjustments due to the types of mechanical linkages and mounting assemblies employed in the prior art.

The problems found in prior art batch chargers are solved by the present invention. The invention provides a batch charger having an adjustable charging plate mechanism, batch gate and charger plate crank assembly which are easily manipulated to permit relatively fast, reproducible and accurate adjustments of each element without costly delays. The present invention also provides a batch charger for glass furnaces having at least two, side-by-side charging plates driven by a versatile power train which permits single or duplex operation by one or both of the drive motors.

SUMMARY OF THE INVENTION

Briefly stated, the present invention provides an improved batch charger for a glass furnace. The batch charger includes a main support frame, preferably carrying a plurality of wheeled truck assemblies for travel on floormounted rails in a direction into and away from the glass furnace. At least two charger plates are provided, each having a plurality of spaced-apart bearing tracks transversely extending on the underside thereof for reciprocal travel on respective sets of wheeled rollers positioned therebeneath. Each of the spaced-apart wheeled roller sets is pivotally attached at respective front and rear ends to a ram of a heavy-duty jack assembly. The extensible and retractable rams of each of the spaced-apart array of jack assemblies raise and lower the front and rear ends of the roller sets. The respective front and rear arrays of jack assemblies are interconnected by rotatable sets of front and rear jacking shafts. Selective rotation of the front and rear jacking shafts causes simultaneous rotation of all of the interconnected shafts and causes consequent simultaneous movement of the respective jacking rams at each roller set. In this manner, the angularity of each charger plate supported on the roller sets is quickly and uniformly adjusted by simple rotative movement of the jacking shafts. Elongated ratchet type handles are attached at the outermost ends of the jacking shafts at the charger frame sidewall to provide means for rapidly rotating the shafts and actuating the heavy-duty jacks. The charger plate also preferably carries means such as an electronic level for providing a visual readout of the angular inclination thereof.

The present invention further includes a charger plate crank assembly having a crank adjustment plate which is eccentrically mounted on a drive shaft. The crank adjustment plate has a plurality of calibrated sets of holes which accept bolts passing through the end of a crank arm rotatably mounted on the adjacent plate. By selective attachment of the crank arm to the eccentric crank attachment plate, in one of the calibrated hole sets, the stroke of an attached charger plate connecting rod is variably set through a working distance of from one to twelve inches, for example.

The novel drive train of the present invention includes a pair of spaced-apart drive motors which are each connected to a gear reducer. Each gear reducer is coupled by lower drive shafts to a lower spur gear which, in turn, drives an upper spur gear and an elongated upper drive shaft. The upper drive shafts carry the aforementioned crank assemblies for reciprocally moving the charger plate. Confronting ends of the lower drive shafts are coupled together with a fast connect/disconnect central coupling so as to interconnect the rotating machinery of each of the drive motors. In this manner, the batch charger of the invention is capable of being powered by both motors coupled together; or individually driven by either the right or left motor when the other motor is deactivated; or by running one or both motors simultaneously with the central coupling disconnected.

The present invention further includes a novel adjustable batch gate mechanism which includes a rotatable adjustment shaft extending from the rear of the charger to the front thereof positioned at each of the plurality of spaced-apart batch gates. The rear of the each of the adjustment shafts carries a ring gear thereon which is coupled to an outer gear ring carried by a circular dial rotatably mounted on a rear wall of the charger. The face of each of the dials carries numeric indicia which is gear calibrated to provide direct reading of the height of the batch gate relative to the rotative movement of the adjustment shaft. In this manner, the batch feed height on the charger plate for each batch gate is accurately determined. The ends of each of the adjustment shafts at the front or feed end of the charger also carry a ring gear which is rotatably coupled to an outer gear set of a larger diameter gear which carries an inner pinion gear thereon. The pinion gear is coupled to a vertically extending rack gear which is affixed to an outer face of the batch gate. Each of the spaced-apart batch gates are slidably mounted in the front of the charger and vertically move in response to the movement of the pinion-driven rack gear so that the height of the raw charge delivered to the charge plates may be accurately controlled. The adjustment shaft gear, ring gear, pinion and rack gears are covered by a closure member at the front of the charger to keep dirt, dust and other foreign matter out of the gear mechanism. A fan unit is also provided which includes ducting communicating with the closure member to provide cooling air to the batch gate gearing mechanism.

These as well as other features and advantages of the present invention will become clear when reference is made to the following detailed description taken with the accompanying drawings.

BRIEF DESCRIPTION OF THE DRAWINGS

FIG. 8 is a plan view of a charger plate used in the batch charger of the present invention;

DETAILED DESCRIPTION OF THE INVENTION

Figure 1:
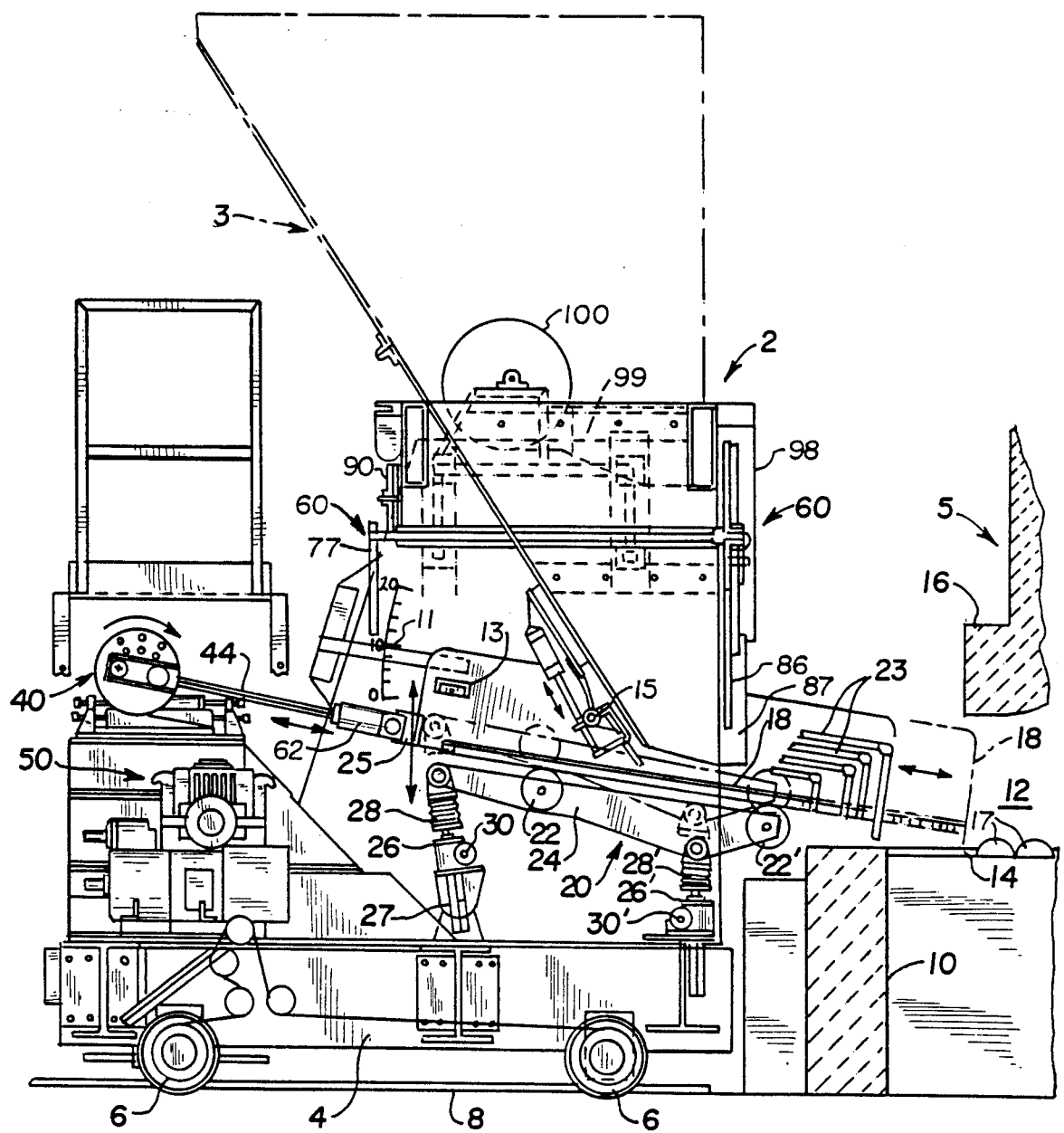
FIG. 1 is a side elevation view of a batch charger of the present invention positioned adjacent a charging end of a glass furnace wherein a portion of the sidewall of the charger is removed in order to more clearly depict the jacking mechanism and other elements of the charger.

With reference to FIG. 1, the batch charger of the invention, generally designated 2, is shown adjacent a charging end of glass furnace 5. A typical glass furnace includes a suspended rear wall 16 spaced inwardly from a lower stationary wall 10 which, at that end, confines the batch of molten glass and defines a so-called "doghouse" area 12 where the charging of the raw batch materials takes place as is known in machines of this type. As is conventional in feeders of this type, raw batch is placed in a hopper chute 3 which is supported by the framing structure of the feeder 4 in a conventional manner. As the reciprocating charger plate 18 moves rearwardly, a sand seal device 15 prevents rearward passage of the raw batch material present on the charger plate, causing a charge 17 of raw batch material to fall off of the nose of the charger plate, as is conventional in batch chargers of this type. Charges 17 of raw batch material are, thus, delivered by the charger plate 18 to the surface 14 of the molten glass in the doghouse area 12. As successive charges 17 are placed onto the molten glass surface, the earlier placed charges are gradually pushed inwardly to the melting zone of the furnace whereupon the charge melts into the glass bath.

The batch charger 2 includes a supporting base or frame structure 4 mounted on wheeled truck assemblies 6, as is conventional with machines of this type, for travel on floor mounted rails 8 toward and away from the rear wall 10 of the glass furnace 5. When in operation, the charger 2 is positioned adjacent to the glass furnace 5, as shown in FIG. 1.

Figure 2:
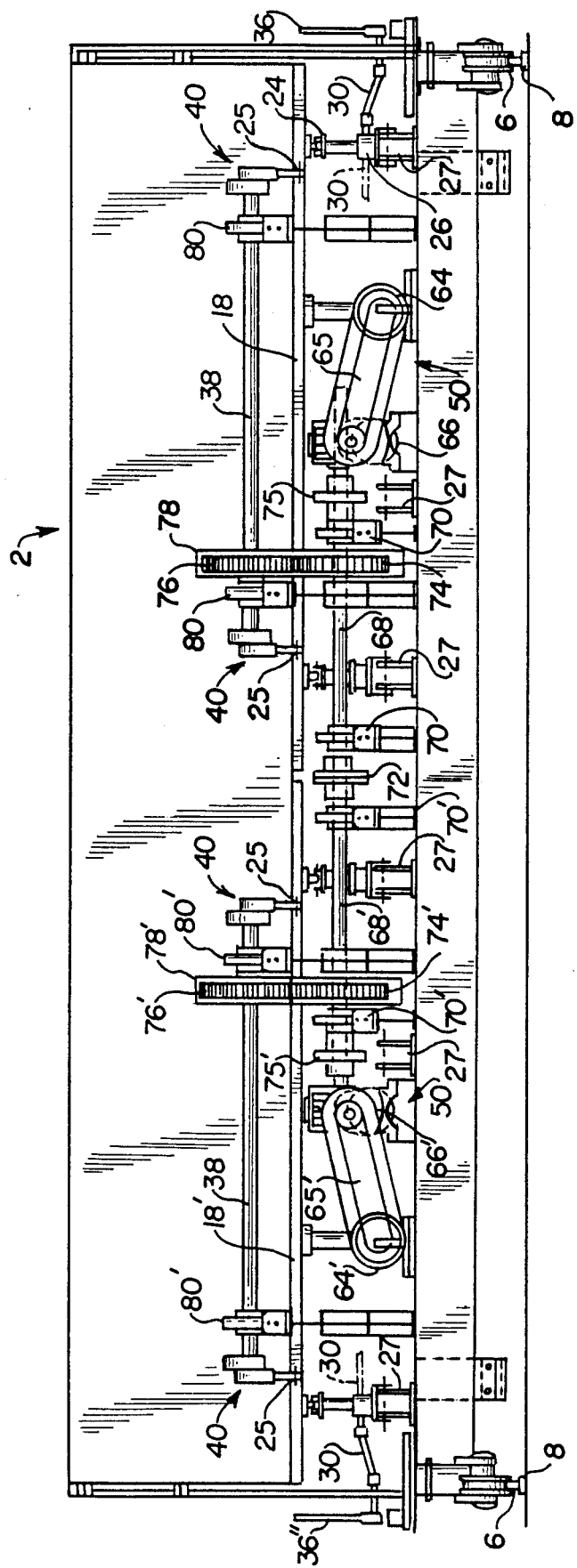
FIG. 2 is a rear elevation view of the batch charger of FIG. 1 but with the sidewalls shown in place.
Figure 3:
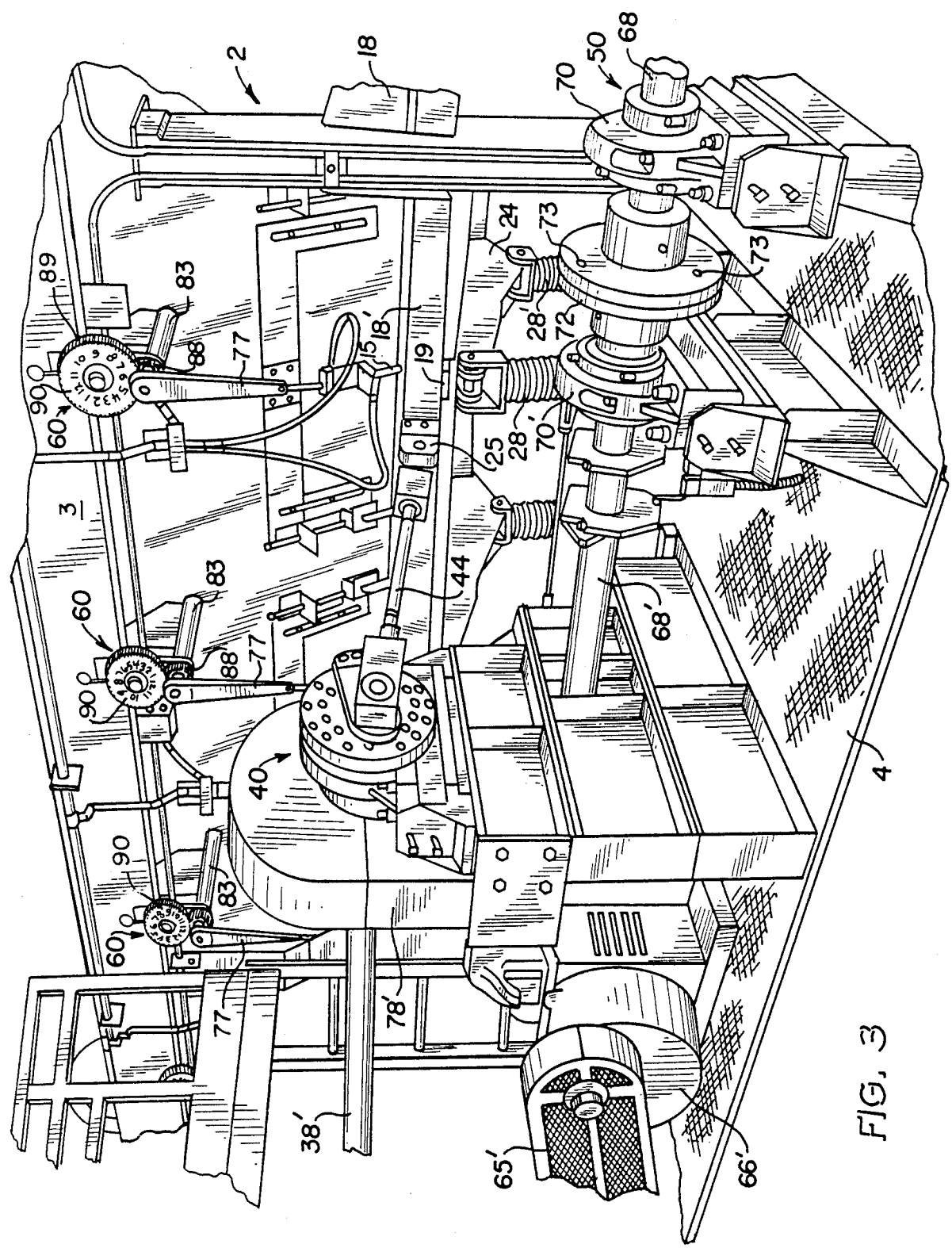
FIG. 3 is an enlarged, partial fragmentary perspective view of the rear of the batch charger of the invention.
Figure 4:
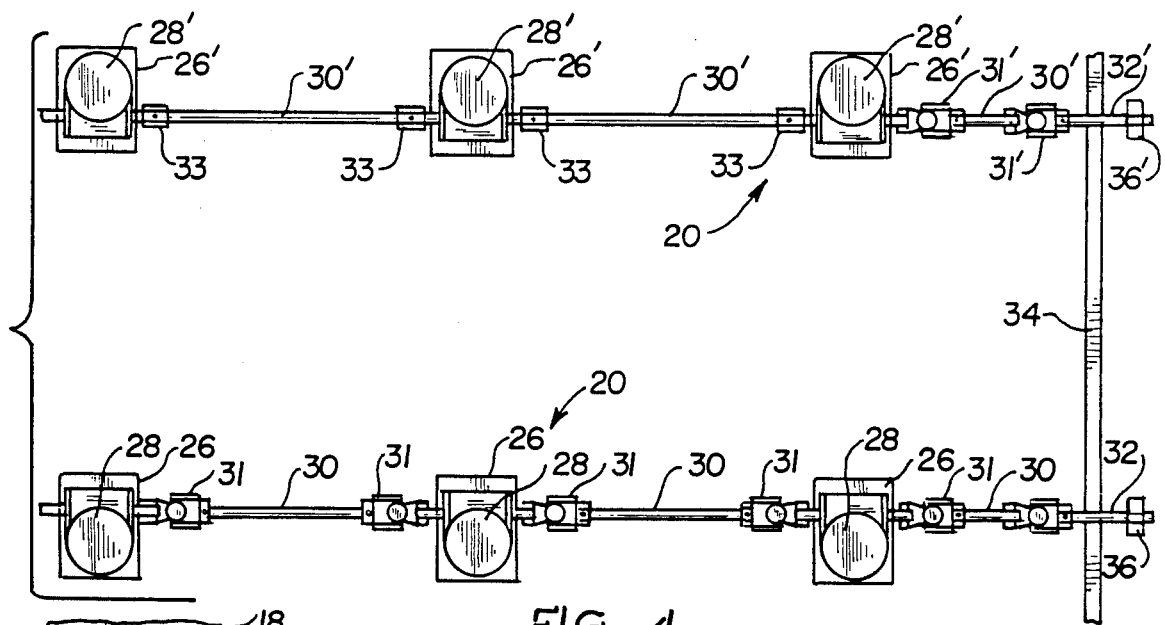
FIG. 4 is a schematic plan view of a jacking mechanism of the present invention for adjusting the angularity of one of the charging plates.

With reference to FIGS. 1–3, the batch charger 2 of the present invention comprises a number of novel features which broadly include an adjustable charging plate assembly 20, an adjustable charger plate crank mechanism 40, a drive train 50 and an adjustable batch gate mechanism 60. Each of these novel features will be explained in greater detail hereinafter, but it will be understood that these features interact in such a way as to provide a batch feeder which functions in a more efficient and versatile manner than heretofore possible with prior feeders.

The charger plate assembly 20 of the invention includes a pair of reciprocating right and left charger plates 18, 18', respectively, which are aligned end-to-end and extend the length of the charger 2. A typical charger plate 18 is on the order of about 10–15 feet or more in length, providing, when paired, an overall charger length of upwards of 30 feet or more. Referring to FIGS. 1 and 8, the charger plate 18 includes a conventional water-cooled nose portion having water piping 23 provided at the exterior to permit the circulation of cooling water therein which permits the charger plate to withstand the elevated temperatures at the doghouse area 12 of the glass furnace. The rear edges of the charger plates carry outwardly extending apertured lugs 25 which pivotally connect to the ends 62 of reciprocating connecting rods 44 of the adjustable crank assemblies 40. The bottom surfaces of each of the charger plates 18, 18' have a plurality of transversely extending, spaced-apart bearing tracks 19 (FIGS. 5, 6 and 8) affixed thereto, which bear against spaced sets of rollers comprising rollers 22 and 22'. The roller sets are made up of a rear roller 22 and a front roller 22' which are rotatably mounted in a rigid lever arm roller frame 24. In this manner, charger plates 18, 18' reciprocally move on the rollers 22, 22' in response to the movement of the connecting rods 44. In order to adjust the angularity of the charger plates relative to the horizon, the present invention provides a plurality of heavy-duty jacks 26 and 26' aligned in spaced-apart arrays positioned beneath each of the bearing tracks 19 for simultaneously raising and lowering the spaced-apart rollers 22 and 22'. A rear portion of the roller frame 24 is pivotally attached to an extensible ram 28 of the rear heavy-duty jack 26, while a front portion of the roller frame 24 is pivotally attached to the ram 28' of the front heavy-duty jack 26'. Each of the jacks 26, 26' have a lifting capacity of about five tons, for example. A roller set and pair of front and rear jacks are provided beneath each of the spaced-apart bearing tracks 19 for selectively moving the charger plates 18 and 18'.

Figure 6:
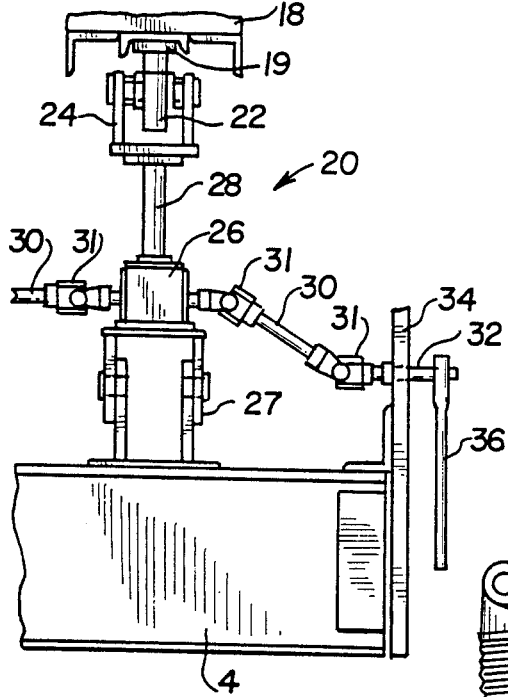
FIG. 6 is a partial side view of one of the jacks of the rear array of jacking mechanisms of the present invention.
Figure 7:
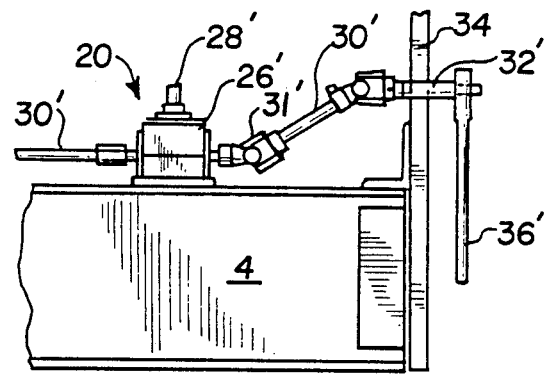
FIG. 7 is a side view of one of the jacks of the front array of jacking mechanisms of the present invention.
Figure 5:
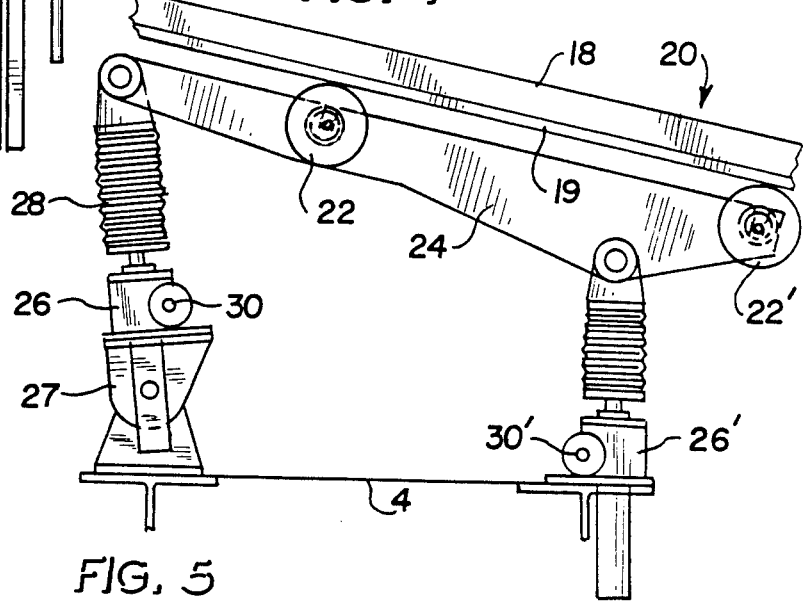
FIG. 5 is a side view of the jacking mechanism depicted in FIG. 4.

In order to simultaneously raise and lower the respective rams of each of the spaced-apart arrays of heavy-duty jacks 26 and 26', a novel linkage system is provided, as depicted in FIGS. 4 through 7. Each of the jacks 26 in the rear array are interconnected by a rotatable jacking shaft 30 which may include universal joint couplings 31 which are applied as needed along the shaft 30. A similar arrangement is employed to motivate the array of spaced-apart front jacks 26', wherein a jacking shaft 30' and sleeve couplings 33 interconnect the individual jack units. Respective distal ends 32 and 32' of the jacking shafts 30, 30' extend through the sidewall 34 of the batch charger and include a ratchet handle 36, 36', respectively, to aid in quickly rotating the shafts. It can be appreciated that when ratchet handle 36 is rotated, the end 32 rotates causing like rotative movement of the universal joints 31 and the jacking shafts 30 to cause simultaneous movement of all of the rams 28 in the rear array of heavy-duty jacks 26. Similar simultaneous upward or downward movement of the forward rams 28, is caused by rotative movement in a clockwise or counterclockwise movement of the front ratchet handle 36'. As can be seen in FIGS. 5 and 6, each of the jacks 26 in the rear array is pivotally mounted to the charger frame 4 by way of a base 27 so as to accommodate the shifting angularity caused by the raising and lowering of the jacks and attached roller frames 24.

The angle of repose of the charger plates 18, 18' is visually observed by use of a fixed angular scale with moveable pointer 11 or by an attached direct read angle sensor device 13. The angle sensor device 13 contains a solid state sensor with a direct reading digital output, sold under the trademark SMART LEVEL by Wedge Innovations of Sunnyvale, Calif.

Figure 10:
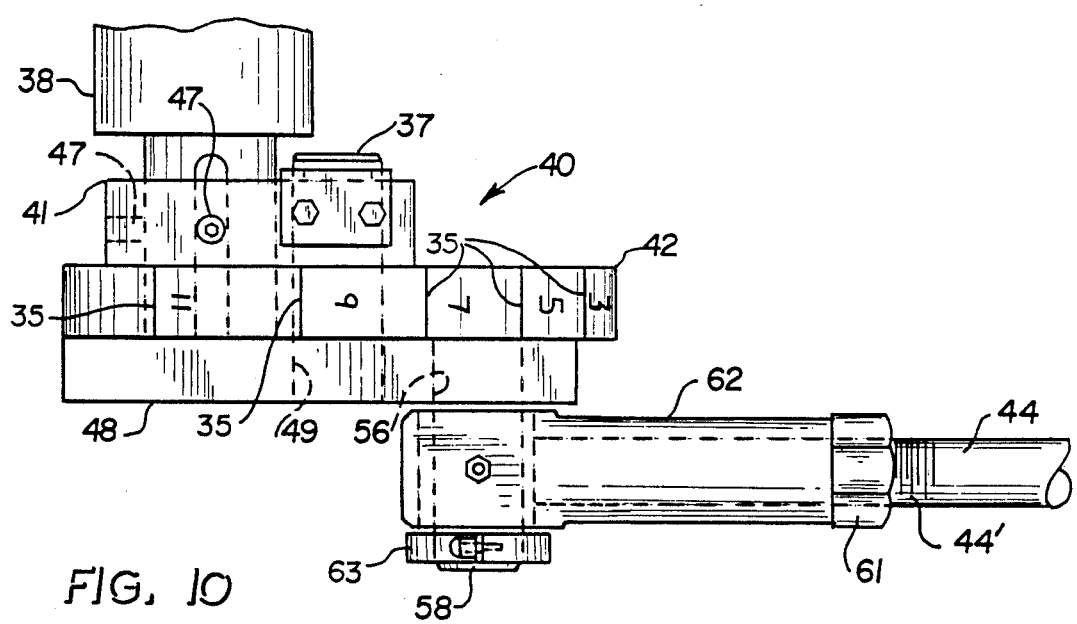
FIG. 10 is a plan view of the adjustable crank arm assembly of FIG. 9.
Figure 9:
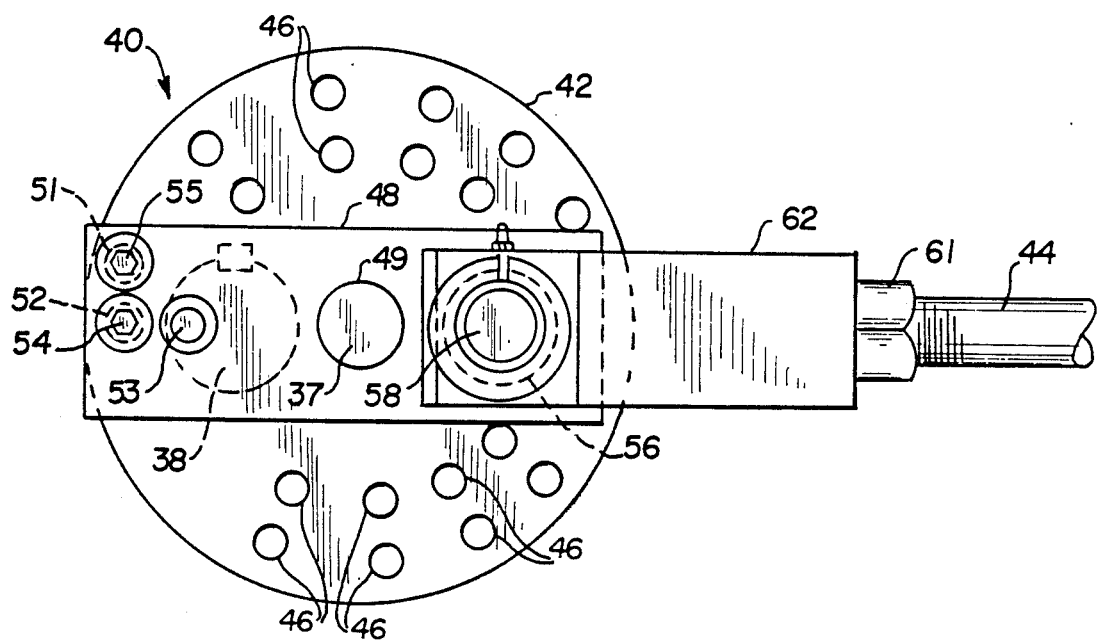
FIG. 9 is a partial side view of an adjustable crank arm assembly of the present invention for reciprocating the charger plate.
Figure 11:
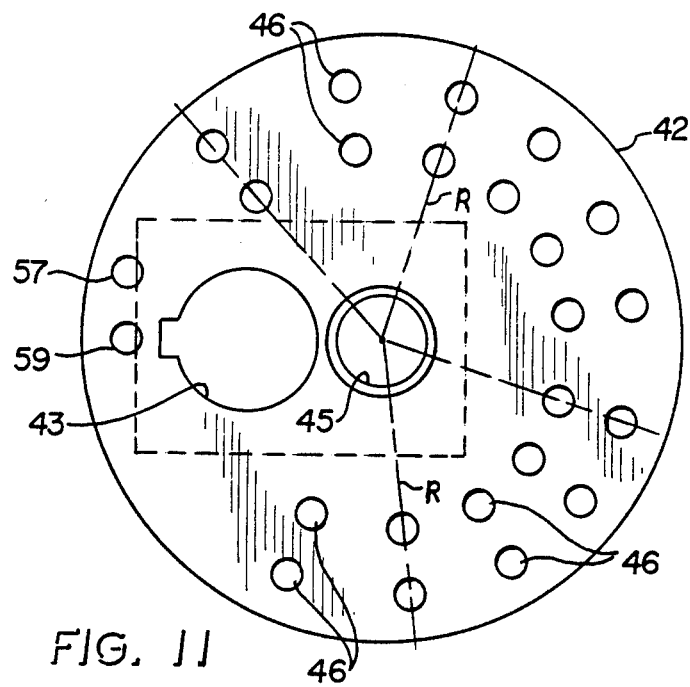
FIG. 11 is a side view of the crank adjustment plate.
Figure 12:
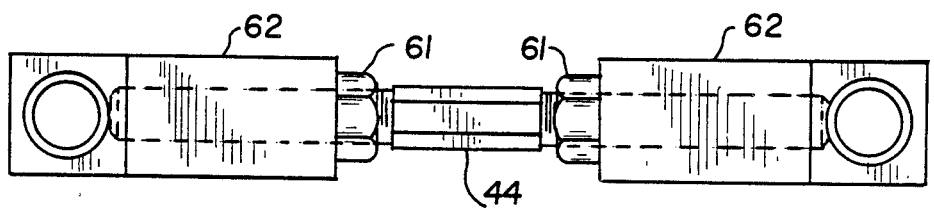
FIG. 12 is an enlarged side view of an adjustable connecting rod used to couple the crank assembly of FIGS. 9 and 10 to the charger plate of FIG. 8.
Figure 13:
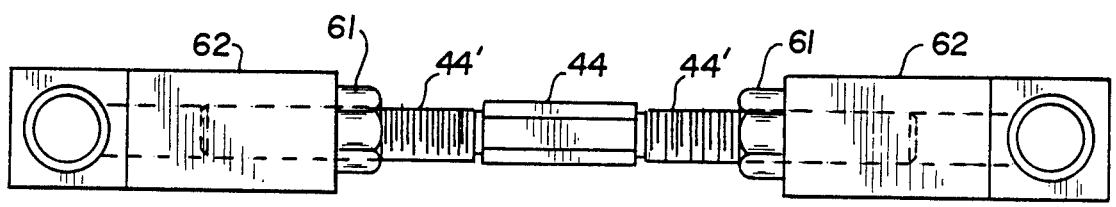
FIG. 13 is a side view of the adjustable connecting rod of FIG. 12 in an extended position.
Figure 14:
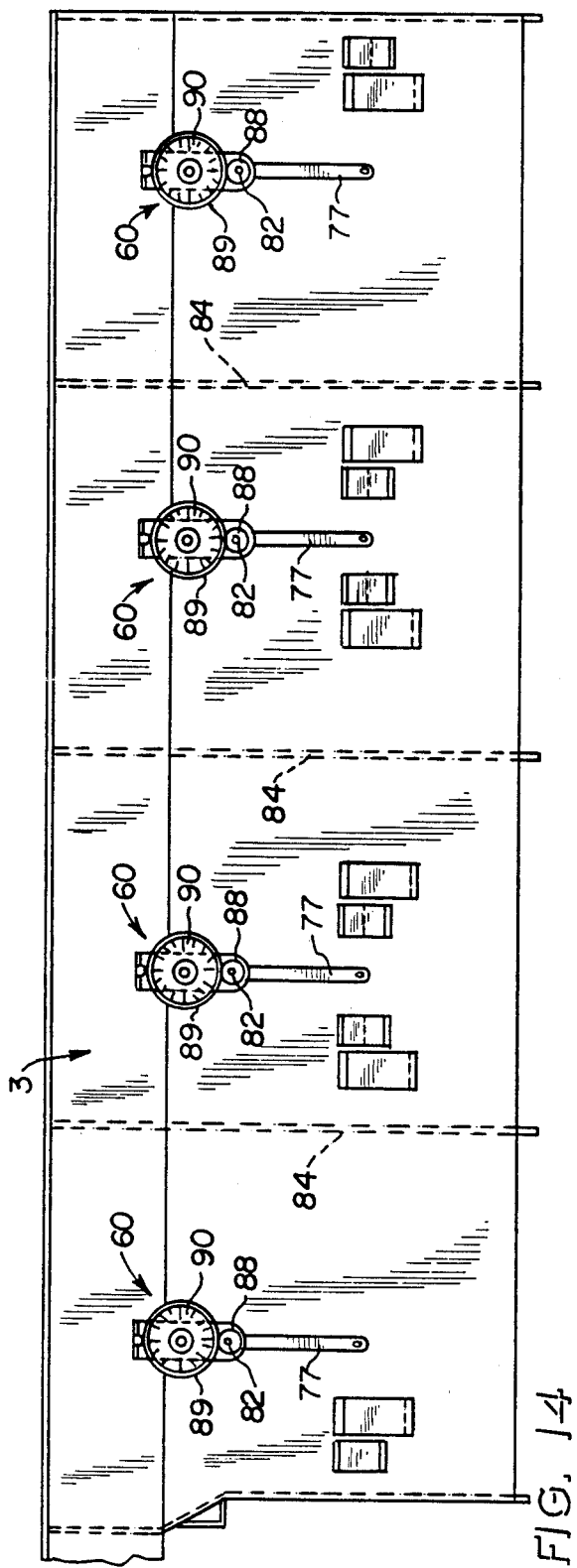
FIG. 14 is a rear elevation view of an array of hopper chutes on one-half of the batch charger.

The adjustable charger plate crank assembly, generally designated 40, can perhaps best be understood with reference to FIGS. 3 and 9–13. The adjustable crank assembly 40 provides an accurate means for incrementally adjusting the stroke of the reciprocating charger plates 18, 18' within a range of about one to twelve inches, in increments of one inch. As best seen in FIGS. 9 and 11, a crank adjustment plate 42 is provided with an offset or eccentrically drilled bore hole 43 having a keyway formed therein for locked rotation with a gear reducer drive shaft 38 of the drive train assembly 50. A spacer block 41 is weldably or otherwise secured to the rear face of the crank adjustment plate 42, aligned with eccentric bore 38 to also receive the end of the drive shaft 38 and to be secured thereto by way of set screws 47. The crank adjustment plate 42 also has a concentrically formed central bore 45 therethrough for reception of a stub shaft 37. An adjustable crank arm 48 having a bore 49 is attached to the adjustment plate 42 by way of stub shaft 37 for rotation thereon when in an unbolted condition, as will be explained hereinafter. The crank arm 48 is free to rotate about shaft 37 when the bolts 54 and 55 of FIG. 9 are removed. One end of the crank arm 48 has three bolt holes 51, 52 and 53 formed therethrough for the acceptance of the bolts 54 and 55. Crank arm 48 also has a bore 56 formed therethrough to receive a crank shaft 58 therein. The outer end of the crank shaft 58 is rotatably received in an end member 62 of a connecting rod 44. As previously explained, the distal end of the connecting rod 44 is pivotally attached to the charger plate 18, at connector bracket 25. The end member 62 is held in place on the crank shaft 58 by a clamping collar 63. In order to adjust the stroke of the connecting rod 44, the adjustment plate 42 is provided with a plurality of calibrated sets of bolt holes 46 which are drilled in pairs along radii "R" around the perimeter thereof as clearly shown in FIG. 11. The pair of holes 52 and 53 formed in the crank arm 48 register with the pairs of holes 46 around the perimeter of the adjustment plate 42. Bolts 54 and 55 are placed therein to lock the crank arm 48 to the adjustment plate 42 so as to prevent relative rotation therebetween, in service, when the crank arm assembly 40 is rotated with the drive shaft 38. The adjustment plate 42 is capable of accommodating the crank arm 48 in twelve preset positions in the embodiment depicted in FIGS. 9 and 11, whereby incremental adjustments of between one to twelve inches can be obtained for the working stroke, measured as the distance between the axis of rotation of the drive shaft 38 and the axis of the crank shaft 58. The greatest distance, which is the twelve inch position, is depicted in FIG. 9. In order to provide sturdy bolt securement in the twelve inch position, an additional bolt hole 51 is provided in the crank arm 48 which aligns with the hole 57 formed in the adjustment plate 42, see FIG. 11. The addition of bore hole 51 permits the insertion of bolt 55 into hole 57 in the adjustment plate 42. In the fully extended position shown in FIG. 9, the hole 53 is positioned over the drive shaft 38 within the bore 43 of the adjustment plate 42, thus making it impossible to place a securement bolt within the usually paired bolt hole 53 when in this position. Hence, the additional bolt holes 51 and 57 align, as well as bolt holes 52 and 59, for securement when in the fully extended position of FIG. 9. Rotation of the crank arm 48 about the crank arm shaft 37 serially aligns the bolt holes 52 and 53 of the crank arm 48, with the underlying pairs of bolt holes 46 in the adjustment plate 42. As each succeeding pair of bolt holes 46 is aligned, the spacing between the axes of the shafts 38 and 58 becomes more closely spaced thus reducing the distance of the stroke. The side edge of the adjustment plate 42, as shown in FIG. 10, contains scribe lines 35 with measurement indicia thereon to indicate a particular stroke length provided by each set of calibrated holes 46. The adjustment plate 42 of FIG. 11 has twelve sets of bolt holes 42 and pair 57, 59 to permit twelve incremental adjustments in the stroke of one inch each. By aligning the bolt holes 52, 53 with the scribe lines 35 adjacent to the numeric indicia appearing on the side edge of the adjustment plate 42, the crank arm 48 is quickly and accurately adjusted relative thereto. In this manner, an accurate and consistent stroke length is obtained at each of the four charger plate crank arm assemblies 40 spaced along the batch charger 2, FIG. 2.

As discussed above, each of the charger plates 18, 18' is reciprocated by a pair of spaced-apart connecting rods 44 driven by rotating crank assembly 40. The connecting rods 44 include threaded ends 44' which are threadably secured within the end members 62. Rotative movement of the central portion of the rod 44 relative to the ends 62 causes overall retraction or extension of the connecting rod, as respectively contrasted in FIGS. 12 and 13. Locking nuts 61 retain the threaded portion 44' in a secured position relative to the end members 62 when a desired overall length for the connecting rod 44 is obtained.

The novel power train assembly 50 of the present invention is perhaps best understood with reference to FIGS. 1, 2 and 3. The power train 50 is made up of a pair of mirror image assemblies comprising a pair of drive motors 64 and 64' positioned on the right and left sides of the machine, respectively. The drive motors 64, 64' are coupled to identical gear reducer units 66 and 66' by way of gear belts 65 and 65'. The gear reducers 66, 66' each drive a lower drive shaft 68, 68', respectively. The lower drive shafts 68 and 68' are journaled for rotation in suitable bearing elements 70, 70' which are vertically adjustable to assure proper horizontal alignment of the drive shafts. A central flanged coupling 72 joins the two lower drive shafts 68 and 68' at their confronting ends. The flanged coupling 72 is split in half at its center and joined by three bolts 73 to provide quick connection and disconnection between the two drive shafts 68, 68' and their respective drive motors 64, 64', see FIGS. 2 and 3. Each of the lower drive shafts 68, 68' carries a lower spur gear 74 and 74' respectively, which matingly engages an upper spur gear 76 and 76'. The spur gear sets 74 and 76 is enclosed in a gear housing or frame 78 on the right hand side and spur gear set 74', 76' is enclosed by a like housing 78' on the left. The upper spur gears 76, 76' each have an upper drive shaft 38, 38' axially fitted therein which respectively rotate with each of the upper spur gears 76, 76' when driven by the lower spur gears 74, 74'. The upper drive shafts 38 and 38' are journaled for rotation within support bearing means 80 and 80' respectively which also include means for vertically adjusting the shafts. As previously described above, rotation of the upper drive shafts 38 and 38' causes simultaneous rotation of the charger plate crank assemblies 40 on the distal ends thereof. The power train assembly 50 of the invention is capable of being run in several operational modes. For example, when the central coupling 72 is joined together by the bolts 73, the lower drive shafts 68 and 68' will rotate together. In one exemplary operating mode, both right and left side drive motors 64 and 64' may be operated together to cause simultaneous reciprocal movement of the charger plates 18 and 18'. If difficulty with one of the drive motors or gear reducers should develop, or if maintenance is required thereon, the motor and gear reducer may be disconnected from the lower drive shaft 68 or 68' by way of a flanged coupling 75 or 75' positioned adjacent to the respective gear reducers 66 and 66'. For example, if drive motor 64' or gear reducer 66' are to be taken out of service for any period, the coupling 75' is disconnected from the lower drive shaft 68'. In this mode, drive motor 64 alone will affect rotation of the lower drive shafts 68 and 68' which, in turn, drive the upper drive shafts 38 and 38' by virtue of the central coupling 72 joining the lower drive shafts. A left side drive is achieved in a like manner with the disconnection of coupling 75. A still further mode of operation envisions the disconnection of the central coupling 72, which would permit the right and left hand drive motors 64 and 64' to drive their respective charger plates 18 and 18' independently of one another. Thus, simultaneous, independent, or sole right or left side motor driven operations are possible with the power train assembly 50 of the invention.

Figure 15:
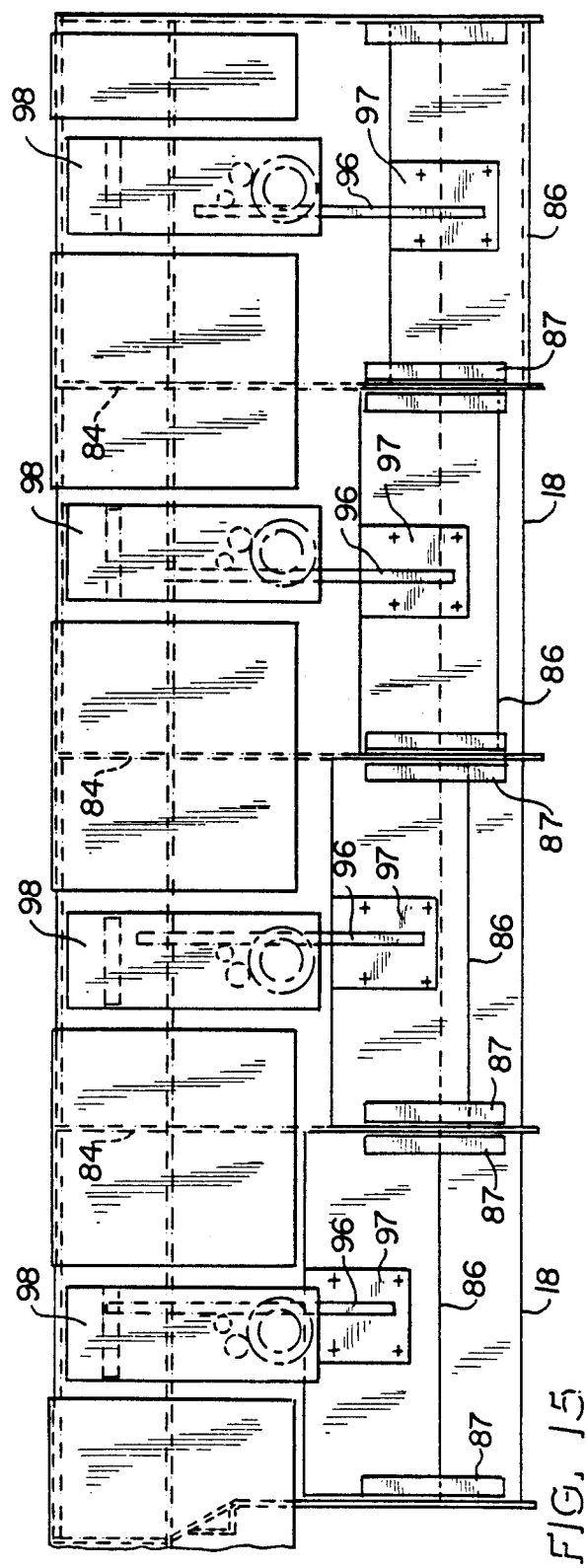
FIG. 15 is a front elevation of an array of moveable batch gates on one half of the batch charger.

The novel adjustable batch gate assembly of the invention, generally designated 60, is depicted in detail in FIGS. 14 through 18. The hopper chute 3 has a plurality of vertically extending, spaced-apart partition walls 84, FIGS. 14 and 15, which define a plurality of side-by-side compartments which hold raw batch material for deposit on the charger plates. For simplicity purposes, FIGS. 14 and 15 only depict one-half of the array of feeder compartments within the hopper chute 3. Each of the charger plates 18 and 18' have, for example, four such feeder compartments located thereabove. Each hopper compartment defined by the vertical partitions 84 contains an adjustable batch gate assembly 60 to permit the individual adjustment of the height of raw batch charge deposited on the charger plate from each respective hopper compartment. The height of the bed of feed material from hopper 3 is determined by the spacing between the moveable batch gate 86 and the charger plates 18, 18'. The moveable batch gate 86 is slidably mounted between an inner plate 85 and stationary guide angles 87 mounted on opposed ends of the batch gate 86. As seen in FIG. 15, the batch gate 86 is adjustable from a fully open position at the left side to a fully closed position at the right side relative to the surface of the charger plate 18 which permits profiling of the thickness of the charge blanket deposited across the width of the glass furnace.

Figure 17:
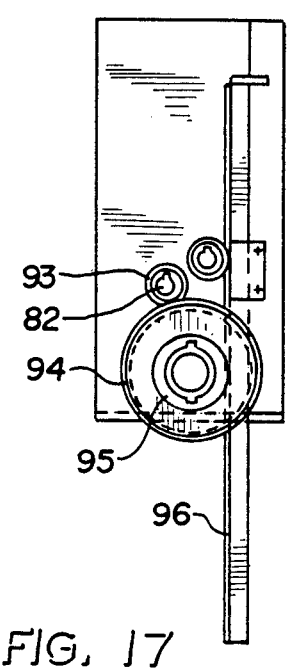
FIG. 17 is a partial front elevation view showing the gear mechanism for moving the batch gate.
Figure 18:
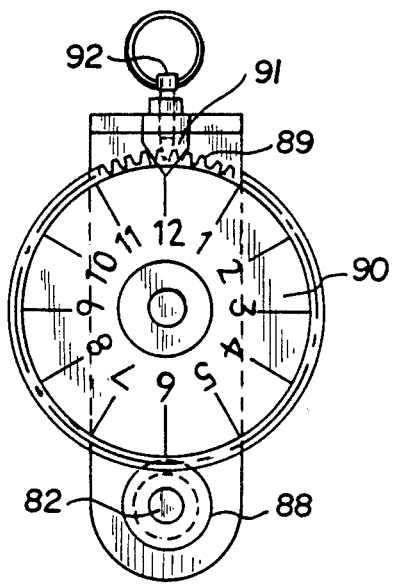
FIG. 18 is an enlarged front view of a geardriven dial face of the batch gate adjustment mechanism.

Each of the moveable batch gates 86 is conveniently lifted and lowered by a gear train arrangement which is motivated by a rotatable adjustment shaft 82 which extends from the rear face of the hopper chute 3 to the front face or charging side thereof. Each of the rotatable adjustment shafts 82 is rotatably fitted within a cylindrical sleeve 83 which is co-extensive therewith and stationary relative thereto. The inner end of each of the rotatable shafts 82 carries a ring gear 88. The ring gear 88 is rotatably coupled to a larger ring gear 89, carried on the outer perimeter of a circular dial 90 which is rotatably mounted on the rear face of the charger hopper chute 3. The face of the dial 90 carries numeric indicia, which are calibrated to the gear train to visually indicate the height of the respective batch gate 86 relative to its spacing from the charger plate 18. The dial 90 is calibrated to move a given distance in response to the rotative movement of the coupled gearing carried by the adjustment shaft 82. A stationary pointer 91 is also provided adjacent the dial 90 to permit direct reading of the numeric height indicia displayed on the face thereof, FIG. 18. A spring-loaded pull ring and locking lug 92 is also provided adjacent to the pointer 91 for engagement with the gear teeth of the ring gear 89 to prevent movement thereof after a desired height has been obtained for the given batch gate 86. The end of the rotatable adjustment shaft 82 at the front face or feeding end of the batch charger also carries a ring gear 93. As seen in FIG. 17, ring gear 93 is keyed to rotate with adjustment shaft 82. Ring gear 93 is rotatably coupled to an outer ring gear 94 which also carries a smaller diameter pinion gear 95 thereon. The pinion gear 95 is rotatably coupled to a vertically extending rack gear 96 which moves in an upward or downward direction responsive to rotative movement of the pinion 95, which in turn, is motivated by rotation of the adjustment shaft 82. The lower portion of the rack gear 96 is secured to a plate 97 which is rigidly secured to the moveable batch gate 86. Thus, it is understood that batch gate 86 vertically moves in an upward or downward direction responsive to clockwise or counterclockwise rotation of the adjustment shaft 82. Rotation of the adjustment shaft 82 is facilitated by a ratchet handle device 77 which is operably connected at the rear end of the shaft 82.

Figure 16:
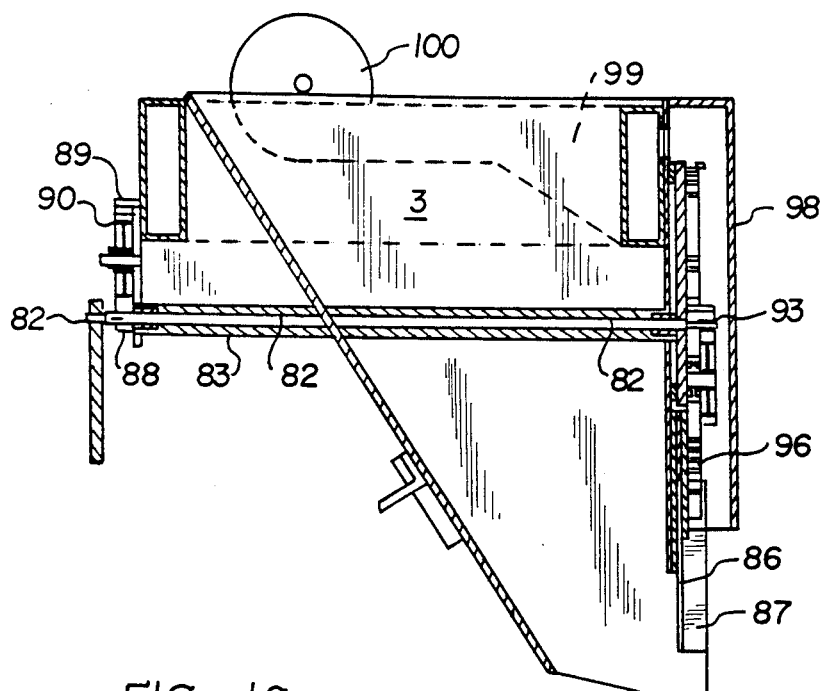
FIG. 16 is a cross sectional side elevation view of a hopper chute and batch gate adjustment mechanism depicted in FIGS. 14 and 15.

A plate-like closure member 98 is affixed to the front face of the batch charger 2 and covers the rotating gear train comprising gears 93, 94, 95 and 96 in order to shield the gears from dirt and other foreign matter. With reference to FIGS. 1 and 16, a fan 100 is mounted on the top of the batch charger 2 and forces a flow of cooling air via duct 99 to the interiors of the closure members 98 in order to cool the gears and maintain a positive draft within the closure in order to prevent the influx of dust, grit and the like into the intermeshing gear train. In this manner, the adjustable batch gate mechanisms 60 will operate in a trouble-free manner with long life and minimum maintenance.

While several specific embodiments of the invention have been described in detail, it will be appreciated by those skilled in the art that various modifications and alternatives to those details could be developed in light of the overall teachings of the disclosure. Accordingly, the particular arrangements are meant to be illustrative only and not limiting as to the scope of the invention which is to be given the full breadth of the appended claims and any and all equivalents thereof.

What is claimed is:

1. A batch charger for feeding raw batch material to a glass making furnace of the type having a main support frame with a raw batch hopper chute therein, and a reciprocable charger plate positioned under the hopper chute for receiving raw batch material therefrom, the improvement comprising:
  (a) jacking means positioned beneath the charger plate for independently raising and lowering front and rear ends of the charger plate;
  (b) adjustable batch gate means associated with the hopper chute including rotatable shaft means having a first end positioned at a rear face of the batch charger and operably coupled by gear means at a second end to a vertically moveable batch gate positioned at a front face of the batch charger for selectively raising and lowering said batch gate by rotative movement of the first end of the shaft means; and
  (c) adjustable crank means for regulating a stroke length of said reciprocal charger plate.

2. The batch charger of claim 1 including at least two reciprocable charger plates, the improvement further including a power train comprising a pair of spaced-apart drive motors, means coupling each of the drive motors to a respective gear reducer means, a pair of axially aligned lower drive shafts, each lower drive shaft coupled to a respective gear reducer means and carrying a flanged coupling at adjacent end portions for detachably joining said lower drive shafts together, a pair of lower spur gears, each attached for rotation with a respective lower drive shaft, a pair of upper spur gears and integral upper drive shafts coupled to a respective lower spur gear, each of said upper drive shafts carrying said adjustable crank means for reciprocating said charger plates, whereby said pair of drive motors are suitable for reciprocating said charger plates by selective operation of either one of said pair of motors and by operation of both of said motors.

3. A batch charger for feeding raw batch material to a glass making furnace of the type having a main support frame with a raw batch hopper chute therein, and a reciprocable charger plate positioned under the hopper chute for receiving raw batch material therefrom, the improvement comprising:
 (a) a plurality of spaced-apart track means affixed to an underside of the reciprocable charger plate and extending transversely across the charger plate from a front edge to a rear edge thereof;
 (b) a plurality of spaced-apart roller sets each including a frame carrying a front and rear roller element for travel on each of said roller plate and for weight bearing support of said reciprocable charger plate;
 (c) a plurality of spaced-apart front and rear arrays of jacking means on said main support frame positioned beneath each of the roller sets, each jacking means having an extensible and retractable ram attached to the frame of the roller sets beneath the respective front and rear roller elements thereof; and
 (d) a pair of jacking shaft means extending from a side of said batch charger to each of said front and rear arrays of jacking means and interconnecting each of the jacking means in each respective front and rear array, whereby upon selective rotation of each of said pair of jacking shaft means, all of the rams of the jacking means in one selected front and rear array of jacking means, move simultaneously for selectively adjusting the angular inclination of said charger plate.

4. The batch charger of claim 3 which includes two reciprocable charger plates and wherein each charger plate has separately adjustable arrays of front and rear jacking means associated therewith.

5. A batch charger for feeding raw batch material to a glass making furnace of the type having a main support frame with a raw batch hopper chute therein, and a reciprocable charger plate positioned under the hopper chute for receiving raw batch material therefrom, the improvement comprising:
 (a) a plurality of spaced-apart roller sets each including a frame carrying a front and rear roller element for travel on an underside of the reciprocable charger plate and for weight bearing support of said reciprocable charger plate;
 (b) a plurality of spaced-apart front and rear arrays of jacking means on said main support frame positioned beneath each of the roller sets each jacking means having an extensible and retractable ram attached to the frame of the roller sets beneath the respective front and rear roller elements thereof; and
 (c) a pair of jacking shaft means extending from a side of said batch charger to each of said front and rear arrays of jacking means and interconnecting each of the jacking means in each respective front and rear array, whereby upon selective rotation of each of said pair of jacking shaft means, all of the rams of the jacking means in one selected front and rear array of jacking means move simultaneously for selectively adjusting an angular inclination of said charger plate.

6. The batch charger of claim 5 including angle measurement means associated with the charger plate to permit visual observation of the angular inclination thereof.

7. The batch charger of claim 6 wherein the angle measurement means includes a solid state sensor having a direct reading numeric display associated therewith.

8. A batch charger for feeding raw batch material to a glass making furnace of the type having main support frame with a raw batch hopper chute therein and a reciprocable charger plate positioned under the hopper chute for receiving raw batch material therefrom, the improvement comprising:
 adjustable batch gate means associated with the hopper chute including rotatable shaft means having a first end positioned at a rear face of the batch charger operably coupled by gear means at a second end to a vertically moveable batch gate positioned at a front face of the batch charger for selectively raising and lowering said batch gate by rotative movement of the first end of the shaft means whereby the raw batch deposited on the charger plate from the hopper chute is selectively regulated.

9. The batch charger of claim 8 including a dial means rotatably mounted on the rear face of the batch charger, said dial means coupled to rotate relative to said shaft means and carrying calibrated indicia thereon, whereby, said dial indicia indicates a height of said batch gate relative to rotative movement of said shaft means.

10. The batch charger of claim 8 including a pinion gear rotatably mounted on the front face of said batch charger coupled to a ring gear carried at the second end of the rotatable shaft and a rack gear coupled to said pinion gear and attached to said moveable batch gate, whereby said batch gate vertically moves in response to rotative movement of said rotatable shaft.

11. The batch charger of claim 10 including closure means surrounding said rack, pinion and ring gears and further including fan and duct means communicating with said closure means for delivery of cooling air to said gears and for maintaining a contaminent-free environment around said gears.

12. A batch charger for feeding raw batch material to a glass making furnace of the type having a main support frame with a raw batch hopper chute therein, and a reciprocable charger plate positioned under the hopper chute for receiving raw batch material therefrom, the improvement comprising:
 (a) a rotatable drive shaft carrying adjustable crank means thereon, said adjustable crank means including a circular crank adjustment plate having a first bore hole therein for mounting on the drive shaft, and having a second bore hole therein spaced from said first bore hole, said crank adjustment plate further having a plurality of spaced-apart bolt holes formed around a perimeter thereof;
 (b) a crank arm rotatably affixed to a stub shaft extending from the second bore of the crank adjustment plate, said crank arm having at least one bolt hole at a first end thereof for selective register with one of the bolt holes around the perimeter of said crank adjustment plate when said crank arm is rotated on said stub shaft, at least one bolt means for passing through said registered bolt holes for securing said crank arm to said crank adjustment plate in a selected, registered position, a second end of said crank arm having a fixed shaft outwardly extending therefrom for rotatable attachment to a first end of an elongated connecting rod member, said connecting rod member having a second end pivotally attached to said reciprocable charger plate, whereby a stroke length of said connecting rod and consequent reciprocation distance of the charger plate is obtained between a minimum and a maximum value by selective register of said crank arm on said crank adjustment plate.

13. The batch charger of claim 12 wherein the crank adjustment plate includes numeric indicia adjacent the perimeter bolt holes to indicate the stroke distance provided by each bolt hole when each bolt hole is placed in registration with the bolt hole carried by the crank arm.

14. The batch charger of claim 12 wherein the perimeter of said crank adjustment plate has spaced-apart pairs of bolt holes and wherein said crank arm has at least a spaced-apart pair of bolt holes for selective registration with said pairs of bolt holes in said crank adjustment plate.

15. The batch charger of claim 12 wherein the minimum and maximum stroke length is between about one and twelve inches.

16. The batch charger of claim 15 wherein the stroke length is adjustable in one inch increments.

17. The batch charger of claim 12 wherein the connecting rod has first and second ends which are threadably connected to a central threaded rod to permit selective extension or retraction of said connecting rod.

18. The batch charger of claim 12 including two reciprocable charger plates wherein each of said charger plates are reciprocated by two spaced-apart adjustable crank means.

19. A batch charger for feeding raw batch material to a glass making furnace of the type having a main support frame with a raw batch hopper chute therein, and a reciprocable charger plate positioned under the hopper chute for receiving raw batch material therefrom, the improvement comprising:

a power train comprising a pair of spaced-apart drive motors, means coupling each of the drive motors to a respective gear reducer means, a pair of axially aligned lower drive shafts, each lower drive shaft coupled to a respective gear reducer means and carrying a flanged coupling at adjacent end portions for detachably joining said lower drive shafts together, a pair of lower spur gears, each attached for rotation with a respective lower drive shaft, a pair of upper spur gears and integral upper drive shafts coupled to a respective lower spur gear, each of said upper drive shafts carrying said adjustable crank means for reciprocating said charger plates, whereby said pair of drive motors are suitable for reciprocating said charger plates by selective operation of either one of said pair of motors and by operation of both of said motors.

20. The batch charger of claim 19 wherein each of said lower drive shafts carries a disconnect coupling for coupling to each of said respective gear reducer means.

* * * * *